United States Patent
Rimpler et al.

[19]

[11] Patent Number: 5,972,238
[45] Date of Patent: Oct. 26, 1999

[54] METHOD OF PREPARING AQUEOUS CHLORINE DIOXIDE SOLUTIONS

[76] Inventors: Manfred Rimpler, Rabensberg 19, D-30900, Wedemark; Fritz Kueke, Haselnussweg 27, D-30629, Hannover; Marcus Rimpler, Industriehof 8-10, D-31180, Giesen, all of Germany

[21] Appl. No.: 09/011,279
[22] PCT Filed: Aug. 9, 1996
[86] PCT No.: PCT/EP96/03543
  § 371 Date: May 11, 1998
  § 102(e) Date: May 11, 1998
[87] PCT Pub. No.: WO97/06098
  PCT Pub. Date: Feb. 20, 1997

[30] Foreign Application Priority Data

Aug. 10, 1995 [DE] Germany .......................... 195 29 504

[51] Int. Cl.[6] .............................. C01B 11/02; C01B 11/04; C01B 11/08
[52] U.S. Cl. ................................ 252/187.21; 252/187.23; 252/187.24; 252/187.25; 252/187.32; 422/29; 422/37
[58] Field of Search ........................ 252/187.21, 187.23, 252/187.24, 187.25, 187.26, 187.27, 187.28, 187.29, 187.32; 134/2; 422/29, 37

[56] References Cited

U.S. PATENT DOCUMENTS

| | | | |
|---|---|---|---|
| 4,574,084 | 3/1986 | Berger | 424/128 |
| 5,110,580 | 5/1992 | Rosenblatt et al. | 423/472 |
| 5,165,910 | 11/1992 | Oikawa et al. | 423/477 |
| 5,405,549 | 4/1995 | Pitochelli | 252/187.21 |

FOREIGN PATENT DOCUMENTS

| | | |
|---|---|---|
| 0 347 320 | 12/1989 | European Pat. Off. |
| 952177 | 11/1949 | France . |
| 27 30 883 | 1/1979 | Germany . |

*Primary Examiner*—Joseph D. Anthony
*Attorney, Agent, or Firm*—McAulay Nissen Goldberg Kiel & Hand, LLP

[57] ABSTRACT

The description relates to a process for the production of aqueous chlorine dioxide solutions through oxidation of chlorite with oxo acids and/or oxo acid anions having a suitable redox potential in a buffered aqueous medium, wherein an acidic aqueous solution A is produced which has a pH of about 5 or less and contains the oxo acids and/or oxo acid anions, and the acidic aqueous solution A is mixed with an aqueous chlorite solution B to form chlorine dioxide, wherein a pH of less than 6.95 is adjusted in the reaction mixture, this pH value being stabilized by a buffering system contained therein.

20 Claims, 1 Drawing Sheet

METHOD OF PREPARING AQUEOUS CHLORINE DIOXIDE SOLUTIONS

This application is a 371 of PCT/EP96 filed Aug. 9, 1996.

BACKGROUND OF THE INVENTION a) Field of the Invention

The invention is directed to a process for the production of aqueous chlorine dioxide solutions through oxidation of chlorite with oxo acids and/or oxo acid anions having a suitable redox potential in a buffered aqueous medium.

b) Description of the Related Art

Numerous attempts have been made up to the present, without satisfactory results, to kill Legionella in hot water systems in order to reduce potential health risks. Further, conditions exist in industrial cold water systems which favor bacterial growth and which lead to a biofilm on the surfaces of transporting lines which has been countered up to the present by biostatic means. For example, isothiazolone, thiocyanates, quaternary ammonium compounds and chlorine-containing compounds are used for this purpose. A great disadvantage of these biostatic means consists in that the cold water often has CSB/BSB values above the limiting values due to the large amounts used. In fact, only an increase in temperature to about 73° C. and an increase in the flow volume have proven suitable for killing Legionella in water systems. However, there is a risk that after a certain period of time the Legionella which have not been killed will propagate again from the biofilm and encrusted deposits in the water line system, especially from so-called dead strains, and will once again cause lasting contamination of the system. Therefore, nonionic phosphonic acids with hydrogen peroxide (EP 0 540 772 A1) or grapefruit seed extract (EO 0 602 891 A1) were recently proposed for combatting Legionella. However, none of these methods has been successful.

Aqueous chlorine dioxide solutions are promising candidates for the areas of application mentioned above. However, the known processes for industrial production of aqueous chlorine dioxide solutions have grave disadvantages which pose obstacles to the use of chlorine dioxide solutions produced by these methods in drinking water and in related areas.

According to the process in DE-PS 27 28 170, 7 to 21 parts by weight of chlorite, 7.5 to 22.5 parts by weight of hypochlorite and 0.5 to 1.5 parts by weight carbonate are dissolved, in that order, in 35 to 105 parts by weight water. In order to adjust a slightly alkaline pH, 7.5 to 22.5 parts by weight of diluted inorganic or organic acid are added. A stabilizer, especially in the form of a peroxide, is advantageously mixed in beforehand.

According to DE-AS 27 30 883, an aqueous chlorine dioxide solution is produced by acidifying a chorite solution to a pH of about 4 and subsequently raising the pH value to about 7.0 to 7.2 by adding a water-soluble metal hydroxide. This is followed by the addition of carbonate. The teaching disclosed in DE-AS 27 30 883 offers the advantage that the aqueous chlorine dioxide solution remains stable exclusively through the sodium carbonate, so that additional stabilizers in the form of peroxides, for example, can be dispensed with. The stabilized chlorine dioxide solution is said to be storable for long periods of time, that is, months and years, and is suitable particularly for treatment of drinking water.

According to the teaching of the two processes mentioned above, the carbonate serves to ensure buffering in the basic pH range. However, the incorporation of the carbonate stabilizing in the alkaline range leads to a high pH value which is undesirable for various reasons: a high pH promotes the reformation of chlorite ions so that the known chlorine dioxide solutions always contain an unwanted proportion of chlorite ions. Moreover, in the alkaline range, highly toxic and therefore undesirable chlorate can form through various types of reactions. For example, when alkaline hypochlorite solution is mixed with chlorite solution, the oxidation of the chlorite beyond the oxidation stage of the chlorine dioxide leads to chlorate. Further, chlorine dioxide tends in the alkaline range toward disproportionation in chlorate and the by-product chlorite.

The process according to DE-PS 34 03 631 is also directed to the production of a slightly alkaline system based on a chlorite solution. It aims at the production of an aqueous "chlorite" solution which is stabilized by a peroxide compound, modified, and adjusted in the alkaline range. In this process, an aqueous solution with a pH of 3 or less containing sulfate ions is mixed with a peroxide compound which is stable therein, wherein a 0.001 to 0.1 molar concentration of peroxide compound results in the end product. This solution is mixed with an aqueous alkaline chlorite solution in such quantity that there results a pH of greater than 7.0, especially between 7.5 and 8.0. A water-soluble phosphate is preferably added to the resulting end product, wherein a buffer action occurs as a result of the third stage of dissociation of the orthophosphoric acid. This satisfies the requirement that a pH value of greater than 7 is maintained.

Although the known process described above admittedly leads to advantageous uses in individual cases, subsequent scientific tests have shown that the chemical designations connected with it are not applicable and, further, improvements would be desirable. With respect to the incorrect formulas, reference is had to M. Rimpler, W. Regment, D. Pacik, "Balneozoon und Hydroxan, Die Anwendung non halogenhaltigen Sauerstoffkomplexen für die Balneologie und den Schwimmbadbereich [Balneo-organisms and Hydroxan, The Use of Halogen-containing Oxygen Complexes in Balneology and Swimming Pools]", Forum St ädte-Hygiene 43 (1992) Sept./Oct., pages 226–230. It is shown in this article that chlorine dioxide formed according to the known process is transferred in the presence of chlorite ions to a charge-transfer complex of the formula $Cl_2O_4^-$ which converts to the tetrachlorodecaoxide anion in the alkaline range by means of oxygen. This anion can also be formed from chlorine dioxide through the action of an oxidizing agent such as hydrogen peroxide. The disadvantage of the products obtained by means of the known methods consists in that they all contain chlorite which is disadvantageously liberated when used, for example, for the treatment of drinking water. In this connection, it must be considered particularly in regard to the treatment of drinking water that legally prescribed limits for chlorite may not be exceeded. The currently applicable maximum value is 0.2 mg chlorite/l.

Oxoferin® is a known activated oxygen which is stabilized in alkaline medium and embedded in a matrix of chlorite ions. The stabilized activated oxygen is in the form of a solution. A medication containing this activated oxygen can be advantageously used for the treatment of skin damage or for wound healing disorders. Its production is described in EP-A-0 093 875.

In the Olin system, chlorine bleach and a chlorite solution are reacted at a pH of 3.5 to 4. Sulfuric acid is used to adjust the pH. This system is commercially available as Model 350

Dioxolin. This process is carried out in a single mixing process, which leads to uncontrolled processes and complex mixtures. It has the further disadvantage that no buffer is provided by the sulfuric acid.

As was first described in W. J. Masschelein, Trib. Eau 42 (542); 1990, pages 49–52, chlorine dioxide has a toxic effect on Legionella. The chlorine dioxide used for technical purposes in this reference was obtained from chlorite and acetic anhydride. After consumption of the strong oxidizing agent chlorine dioxide, a mixture of this kind, due to the acetate carbon body contained therein, is a nutritional base for other undesirable microorganisms especially in drinking water systems. This fact therefore militates against the use of an aqueous chlorine dioxide mixture of this kind in the foodstuff and drinking water domains, especially since the addition of organics to drinking water has meanwhile been prohibited in many countries (e.g., in the German Federal Republic (TVO)).

Aside from the above-described processes for chlorine dioxide production through oxidation or disproportionation of chlorite, chlorine dioxide can also be obtained by reduction of chlorates. A process of this type is the Mathieson process or sulfur dioxide process. This is a counterflow process in which a solution of sodium chlorate is mixed with sulfuric acid at the head of a reaction vessel and an air-sulfur dioxide mixture is blown in at the bottom. An air-chlorine dioxide mixture can be removed from the head of this reactor. This mixture also contains proportions of chlorine.

In order to reduce any chlorine that is formed, a surplus of sulfur dioxide is used in the process. The addition of chloride ions also increases the yield of chlorine dioxide. A process of this kind is disclosed, e.g., in WO 90/05698.

The Solvay process or methanol process uses methanol for the reduction of the chlorate. Since the reaction speed of this process is lower than that of the Mathieson process, the process must be carried out at a higher temperature. A process of this kind is described, e.g., in EP 0 357 198.

Chlorate can also be reduced to chlorine dioxide by chloride. The resulting chlorine dioxide is always contaminated with chlorine gas. If this contamination is undesirable, the chlorine dioxide is absorbed by an aqueous solution and thus separated from the chlorine. A process of this kind is described in EP 0 106 503.

OBJECT AND SUMMARY OF THE INVENTION

The primary object of the present invention is to further develop the process described above in such a way that aqueous chlorite solutions are converted to a desired end concentration of chlorine dioxide in the product of the process through a simple and dependable management of the process by means of a suitable selection of the concentration of starter materials. In so doing, unwanted chlorite is extensively eliminated so that the level of chlorite per liter can be maintained safely below the maximum prescribed by currently applicable drinking water regulations (0.2 mg of chlorite per liter). Contamination by harmful organics is also eliminated.

According to the invention, this object is met in that an acidic aqueous solution A is produced which has a pH of about 5 or less and contains the oxo acids and/or oxo acid anions, and the acidic aqueous solution A is mixed with an aqueous chlorite solution B to form chlorine dioxide, wherein a pH of less than 6.95 is adjusted in the reaction mixture, this pH value being stabilized by an incorporated buffering system. Aqueous chlorine dioxide solutions are particularly stable in this range.

For the purpose of the invention, "oxo acids and/or oxo acid anions" denotes a system of species in protolytic equilibrium which are derived from oxo acids (elemental oxygen acids) whose redox potential (oxidation potential) is suitable for the oxidation of chlorite to chlorine dioxide. The standard redox potential for gaseous $ClO_2$ is 1.15 V and 0.95 V for $ClO_2$ dissolved in water. The utilized oxo acid must therefore have a redox potential in this order of magnitude or greater under the reaction conditions. For the definition of redox potential, reference is had to Römpp Chemie-Lexikon, Franckh'sche Verlagshandlung, Stuttgart, 8th Edition, 1985, page 3522. Accordingly, oxo acids will be understood hereinafter also to include oxo acid anions in protolytic equilibrium unless otherwise noted. Suitable examples of oxo acids include hypochlorous acid, permonosulfuric acid (Caro's acid), perdisulfuric acid, permanganic acid, and other acids with sufficient redox potential. Hypochlorous acid and permonosulfuric acid are preferred.

DESCRIPTION OF THE PREFERRED EMBODIMENTS

The invention will be described more fully hereinafter using the example of hypochlorous acid. However, all remarks pertain equally to other oxo acids within the meaning of the invention whenever applicable.

The essential distinguishing feature of the invention consists in the production of an acidic aqueous solution of hypochlorous acid with a pH of about 5 or less. The pH of the acidic aqueous solution A is preferably adjusted to about 1 to about 5, particularly from 1.5 to 3.5. This acidic aqueous solution A is subsequently mixed with an aqueous chlorite solution B. The solution A must be sufficiently acid so that a pH of less than 6.95 results in the reaction mixture. The pH of less than 6.95 must be stabilized by an incorporated buffer system. The incorporation of the above-mentioned buffer system serves primarily to prevent the pH from rising to values of greater than 6.95. This risk is present, for example, when using lime-containing tap water. That is, if the reaction system is changed to the neutral or even alkaline range, the disadvantages and unwanted consequences described above will occur. Thus, the oxidizing power of the hypochlorous acid is less pronounced in the alkaline range and there is a tendency, moreover, toward disproportionation reactions, wherein chlorate can also form, among others. On the other hand, the pH of the reaction mixture must be prevented from dropping too far. The specified lower limit of the pH value is approximately 2. Below this value, chlorate formation can occur according to the following equation:

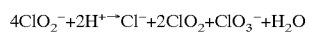

$$4ClO_2^- + 2H^+ \rightarrow Cl^- + 2ClO_2 + ClO_3^- + H_2O$$

In order to maintain this pH range, it may be necessary in individual cases to use two different buffer systems.

Modifications are possible in the incorporation of the buffering system. For example, an acidified hypochlorite solution can be mixed with an aqueous chlorite solution while simultaneously incorporating the buffer system. Alternatively, and preferably, the acidic aqueous solution A incorporates a buffer system. The buffer system is preferably a weak acid. Weak acids within the meaning of the invention are characterized by a $pK_S$ value in the region of approximately 1 to 9. Weak acids within the meaning of the invention are also multiproton acids if their $pK_S$ values fall within the above-indicated range.

The acidic aqueous solution A can already be sufficiently acid itself, due to the utilized oxo acid, to dispense with further addition of acid. If the utilized oxo acid is too weak or if the oxo acid anions are used to start, it is necessary to add an external acid for acidification. The invention is not subject to any special limitations as regards the choice of acid for acidification. The acids may be strong or weak. The following acids are mentioned by way of example: hydrochloric acid, sulfuric acid, acetic acid, phosphoric acid or suitable Lewis acids.

The use of weak acids is particularly advantageous, since they simultaneously fulfill the function of a buffer system in the reaction system after partial neutralization through the alkaline chlorite solution B. Orthophosphoric acid is particularly preferred. By suitable selection of the amount of phosphoric acid, a mixture of primary and secondary phosphate is present in the reaction mixture which buffers in the pH range of around 6.92 or less.

It is particularly advantageous within the scope of the invention when an aqueous solution of hypochlorous acid is produced by acidifying an aqueous solution of an alkaline hypochlorite or alkaline-earth hypochlorite, for example. Similarly, a solution of permonosulfuric acid is advantageously obtained by acidification of an aqueous solution of alkali salts and/or alkaline-earth salts of permonosulfuric acid. Also, in this connection, phosphoric acid produces advantageous results because it is a medium-strong acid with a $pK_5$ value of 1.96 in its first dissociation stage. Especially within the acidic aqueous solution A, this stage ensures the buffering of the latter in the pH range around 2. When mixed with the alkaline aqueous chlorite solution, the phosphoric acid causes the buffering, in accordance with the invention, at a value below 6.95 due to the suitable position of its second dissociation constant. If another acid is used, it may be necessary to include an additional buffer system suitable for stabilizing the pH occurring in the reaction mixture at below 6.95. Suitable buffer systems are described, for example, in D. D. Perrin and B. Dempsey, "Buffers for pH and Metal Ion Control", Chapman and Hall Ltd., London, first edition, 1974.

The person skilled in the art is not subject to any important restrictions as regards the "chlorite" solution discussed within the framework of the invention. It is preferably an alkaline chlorite and/or alkaline-earth chlorite, especially sodium chlorite, potassium chlorite and calcium chlorite.

Reaction is referred to expressly within the framework of the invention. By this is meant that an extensively quantitative stoichiometric reaction of chlorite with oxo acid is carried out, which is ensured at a molar ratio of (1.1 to 0.9):1, preferably 1:1, in relation to redox equivalents. By a unit related to redox equivalents is meant the hypothetical fraction of the oxo acid which is capable of taking on an electron. The reaction of chlorite with hypochlorous acid is accordingly carried out in the quantitative framework of (1.8 to 2.2):1, preferably 2:1. In this range, acceptable results are achieved in connection with drinking water and bathing water in comparison with the conventional process of the prior art. In particular, it would not be prejudicial to the objective of the process if the amount of hypochlorous acid were slightly in excess of the exact stoichiometric ratio. In order to meet the objective, a solution A whose concentration of hypochlorous acid is exactly known is advantageously added to the respective reactor for reaction with the chlorite solution. In particular, this makes it possible to determine the concentration of hypochlorous acid without delay by measuring the redox potential. Voltage values are determined in mV by means of a redox measuring system which immediately provides the present concentration of hypochlorous acid with the aid of the Nernst equation. The readout value in mV corresponds to a fixed concentration. This concentration is in turn used within the framework of the invention to suitably balance the amounts or concentrations of solution A and solution B, e.g., in order to be able to maintain the exactly adapted or desired quantity of hypochlorous acid at a given flow of the aqueous chlorite solution into the reactor system.

The process according to the invention can be carried out in any reactor. These can be reactors for batchwise (intermittent) operation or continuous operation. Homogeneous, stationary stirring-tank reactors, stirring-tank reactors in a cascade arrangement or reaction tubes or flow tubes are suitable. The latter enable advantageous continuous operation. However, it must be ensured, particularly in flow tubes, that turbulent conditions are maintained therein, wherein the Reynolds number must be above 2,300. With regard to the Reynolds Number, reference is had to R ömpp Chemielexikon, 9th Edition, Vol. 5, 1992, pages 3861–3862. Turbulent conditions can easily be achieved therein by installing turbulence-generating elements such as Raschig rings in particular. Further, it is self-evident that a sufficiently long reaction time must be observed for the reaction in the reaction mixture. In order to ensure this, a Bodenstein number from 0 to approximately 500 can be specified. The Bodenstein number within the reaction system is particularly preferably between 5 and 40. Details concerning the Bodenstein number are given in E. Fitzer, W. Fritz, "Technische Chemie, eine Einführung in die Chemische Reaktionstechnik [Technical Chemistry, An introduction to Chemical Reaction Systems]", 2nd edition, Springer-Verlag 1982, pages 343 to 352, especially page 346.

With respect to the use of the chlorine dioxide solution obtained according to the invention for treatment of drinking water, it is advantageous to add a hypochlorite solution to this chlorine dioxide solution, in particular a sodium hypochlorite solution, for the renewed formation of hypochlorous acid. In this way, the possible formation of chlorite ions is suppressed or excluded when applied. By adding hypochlorous acid, chlorite formed by redox reaction is immediately converted into chlorine dioxide again, ensuring a long-lasting effect. The maximum achievable chlorite concentration can be limited by the initially selected chlorine dioxide concentration, so that the maximum permissible chlorite concentration for drinking water can be adhered to in a simple manner.

The combination of hypochlorous acid with chlorine dioxide solution leads to a synergistic effect resulting in an optimizing of the safe use of the product of the process and efficiency for guaranteeing drinking water hygiene. In this connection, the invention makes deliberate use of the advantageous bactericidal dynamics achieved by the synergistic action of chlorine dioxide and hypochlorous acid in killing bacteria While the chlorine dioxide is clearly better for attacking and damaging the lipid component of the bacterial membrane, the hypochlorous acid reinforces the results in a lasting manner. This offers the special advantage of effective elimination of *Legionella Pneumophila* which is responsible for Legionnaires' disease.

BRIEF DESCRIPTION OF THE DRAWING

An apparatus for carrying out the process according to the invention which has special advantages is described by way of example with reference to the accompanying FIG. 1.

Figure 1:
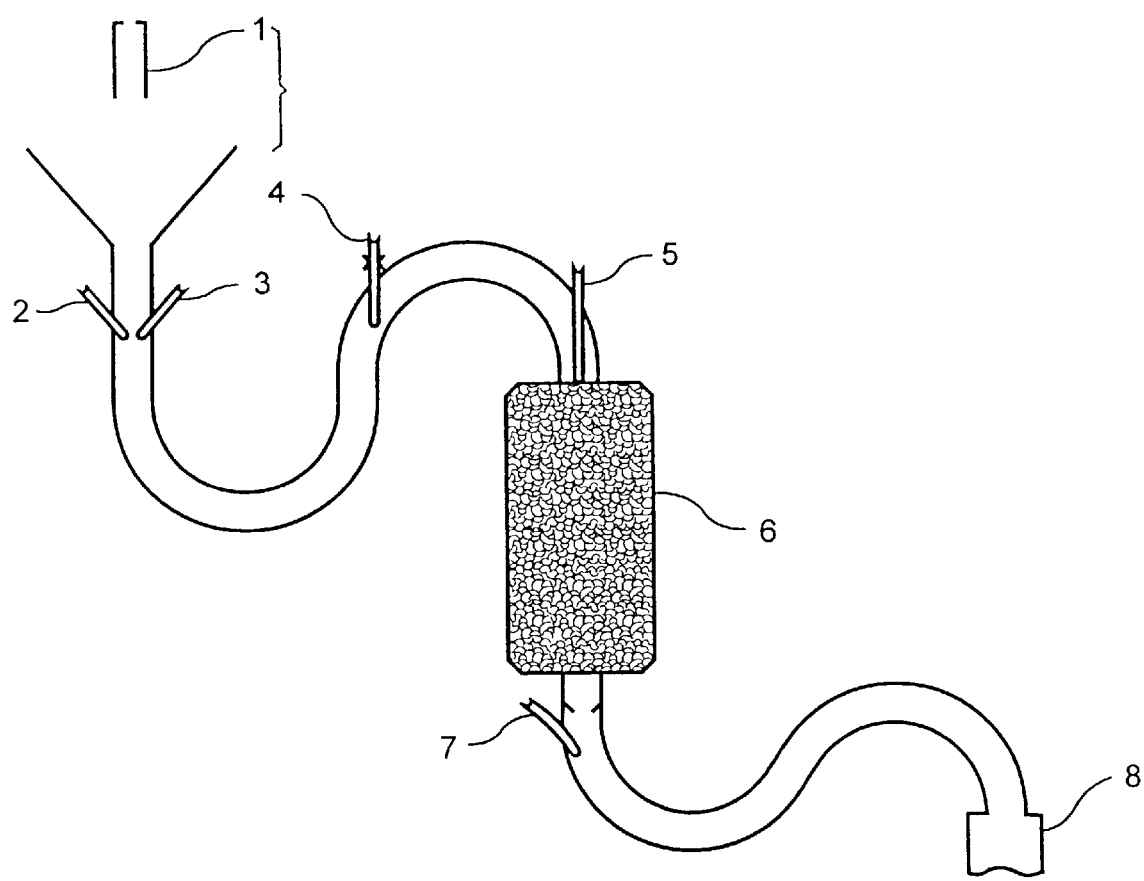
FIG. 1 describes an apparatus that has a flow tube reactor with a vertical flow from top to bottom which is filled with turbulence-generating elements. In particular, the following reference numbers are used in a preferred construction: 1=water supply, 2=metering of phosphoric acid, 3=metering of chlorine bleach, 4=redox electrode, 5=metering of chlorite solution, 6=flow tube reactor with Raschig rings, 7=metering of chlorine bleach, and 8=supply vessel.

The present invention is linked with many advantages. A stable, buffered aqueous chlorine dioxide solution can be produced in a simple manner, for example, using a flow tube reactor. For this purpose, commercially available alkaline hypochlorites and alkaline chlorites can be used to start. The solution of the alkaline chlorite is advantageously acidified with phosphoric acid resulting in the simultaneous introduction of the buffer system $H_2PO_4^-/HPO_4^{2-}$ which stabilizes the finished reaction mixture at a pH of less than 6.95. However, other acids can also be used, wherein it may be necessary to add an external buffer system which buffers in approximately the same range. A chlorine dioxide solution with a surplus of $ClO^-$ surplus can be prepared for preventing reformation of chlorites. The use of hydrogen peroxide or other peroxides with their undesirable effects can be excluded. Further, the above-mentioned addition of phosphoric acid offers the additional advantage that it is a corrosion inhibitor when the product of the process is applied in metallic systems. The aqueous chlorine dioxide solution obtained according to the invention can be used in a particularly advantageous manner for the disinfection of drinking water and of water for industrial or business use and for the disinfection of swimming pool water. A further area of application is in the treatment of cyanide-containing waste water from electrolytic processes. The destruction of cyanide by means of chlorine dioxide leads to the cyanate by way of cyanogen in accordance with the following formula:

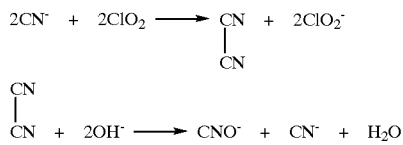

The resulting chlorite can in turn react, in the presence of transition metals, with cyanides to form cyanate and chloride. A chlorine dioxide solution according to the invention can also destroy cyano complexes, e.g.:

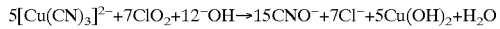

The aqueous chlorine dioxide solution which is formed is preferably adjusted to a pH of about 9 to 10 prior to use for destroying cyanides and cyano-metal complexes. The formation of hydrogen cyanide is reliably ruled out by this step.

Cyanide detoxification is carried out with the chlorine dioxide solution according to the invention faster and better than when using pure chlorine bleach; in this connection, reference is had to Cocheci, V., Taubert, R., and Martin, A., "Removal of Cyanide from Wastewater", Bull Stiint. Teh. Inst. Politeh. Timisoara, 1969, 14 (2), pages 497–502. The chlorine dioxide solution obtained in accordance with the invention can also be used for reducing CSB/BSB and for breaking up metal complexes for subsequent precipitation of the metals and removal of the metals from the wastewater by means of ion exchange and sorption processes.

The invention will be explained more fully hereinafter by means of examples.

EXAMPLE 1

In a flow tube reactor, 0.08 ml/s of a hypochlorite ion-containing aqueous solution (78.49 g $OCl^-$/l) and 0.56 ml/s of an orthophosphoric acid (145.35 g/l) are introduced through two injection locations located opposite one another at a Reynolds Number greater than 2,300 in a volume flow of $8.33 * 10^{-5}$ $m^3$/s of water. After mixing the two components in the turbulent aqueous flow, a redox potential (platinum electrode with a silver-silver chloride electrode) of approximately 1,200 mV is measured. The pH of this solution is 2.5. A chlorite-containing aqueous solution (388.08 g $ClO^-$/l) is introduced at 0.043 ml/s into this volume flow through an injection location directly preceding a flow reactor. The reaction mixture then enters the tube reactor and remains therein for a holding time of approximately 32 s. During this time period, the hypochlorite is reacted with the chlorite quantitatively to form chlorine dioxide and chloride.

After the products exit the reactor, 0.318 ml/s of the chlorine bleach mentioned above is injected into the volume flow by means of an additional injection location. The solution now has a pH of 3.65 and the redox potential is approximately 1.051 mV. This preparation (0.2 g/l chlorine dioxide and 0.3 g/l HOCl) is collected in a supply vessel and can be dispensed from there into a drinking water system.

EXAMPLE 2

The same steps are taken as in Example 1. However, after the tube reactor, a redox-inactive base is added instead of the chlorine bleach, so that the pH value of the reaction mixture in the supply vessel is between 9 and 10. An oxidant solution of this type adjusted in the alkaline range is used in systems in which an alkaline milieu is preferred, e.g., when cyano complexes are to be destroyed and the heavy metal ions simultaneously precipitated as hydroxide complexes. It is noted that the chlorine dioxide solution is first adjusted to a high pH before use. The production of the chlorine dioxide solution is carried out, according to the invention, in a buffered, slightly acidic pH resulting in the advantage that the reaction is carried out quantitatively and no formation of chlorate occurs.

While the foregoing description and drawings represent the preferred embodiments of the present invention, it will be obvious to those skilled in the art that various changes and modifications may be made therein without departing from the true spirit and scope of the present invention.

What is claimed is:

1. A process for the production of aqueous chlorine dioxide solutions through oxidation of chlorite with oxo acids and/or oxo acid anions having a suitable redox potential in a buffered aqueous medium, comprising the steps of:

producing an acidic aqueous solution A which has a pH of about 5 or less and contains the oxo acids and/or oxo acid anions; and mixing the acidic aqueous solution A with an aqueous chlorite solution B to form chlorine dioxide, wherein a pH of less than 6.95 is adjusted in the reaction mixture, said pH value being stabilized by a buffering system contained therein.

2. The process according to claim 1, wherein the pH of the acidic aqueous solution A is adjusted to approximately 1 to approximately 5.

3. The process according to claim 1, wherein an aqueous solution of alkaline salts and/or alkaline-earth salts of chlorous acid are/is used as solution B.

4. The process according to claim 1, wherein the concentration of the system of oxo acids and/or oxo acid anions in the acidic aqueous solution A is determined by measuring the redox potential and the quantities of solution A and solution B are correspondingly balanced.

5. The process according to claim 1, wherein hypochlorous acid/hypochlorite and/or permonosulfuric acid/permonosulfate are used as oxo acids and/or as oxo acid anions.

6. The process according to claim 5, wherein the acidic aqueous solution A is obtained by acidifying a solution of alkaline salts and/or alkaline-earth salts of hypochlorous acid and/or of permonosulfuric acid.

7. The process according to claim 1, wherein the chlorite is reacted with the system of oxo acids and/or oxo acid anions in a molar ratio, with respect to redox equivalents, of (1.1 to 0.9):1.

8. The process of claim 7, wherein the molar ratio is approximately 1:1.

9. The process according to claim 1, wherein a Bodenstein number from 0 to approximately 500, is maintained in the reactor for extensive oxidation of chlorite with the system of oxo acids and/or oxo acid anions.

10. The process of claim 9, wherein the Bodenstein number is between approximately 5 and 40.

11. The process according to claim 1, wherein the reaction mixture for oxidation of the chlorite is carried out with a continuous-operation reaction reactor.

12. The process according to claim 11, wherein a flow tube is used as reaction reactor.

13. The process according to claim 1, wherein the process is carried out in a reaction reactor in which a Reynolds number greater than 2,300 is adjusted.

14. The process according to claim 13, wherein turbulence-generating elements are installed in the flow tube.

15. The process according to claim 1, wherein an aqueous hypochlorite solution, is additionally added to the formed aqueous chlorine dioxide solution in order to form hypochlorous acid.

16. The process of claim 15, wherein the added solution is a sodium hypochlorite solution.

17. The process according to claim 1, wherein the buffering system is incorporated into the acidic aqueous solution A.

18. The process according to claim 17, wherein a weak acid with a suitable $pK_S$ value is incorporated in the acidic aqueous solution A as a buffering system.

19. The process according to claim 18, wherein the weak acid is added to the aqueous solution A for acidifying and for incorporating the buffering system simultaneously.

20. The process according to claim 18, wherein orthophosphoric acid is used as weak acid.

* * * * *